3,383,352
DISPERSIONS OF SYNTHETIC POLYMERS CONTAINING HETEROATOMS BETWEEN MONOMER UNITS
Enid Gillian Duell, London, and Harold Robert Thomas, Slough, England, assignors to Imperial Chemical Industries Limited, London, England, a corporation of Great Britain
No Drawing. Continuation-in-part of applications Ser. No. 367,884 and Ser. No. 367,885, May 15, 1964. This application Sept. 28, 1966, Ser. No. 582,557
Claims priority, application Great Britain, May 16, 1963, 19,505/63, 19,506/63
16 Claims. (Cl. 260—33.6)

ABSTRACT OF THE DISCLOSURE

A process for producing dispersions of particles of polymers containing heteroatoms other than carbon in links between monomers or comers. Polymerization is carried out with monomer or comer dissolved in organic liquid in which the polymers are insoluble and in the presence of a block or graft copolymer of which one polymeric component is solvated by the organic liquid and another is non-solvated and becomes associated with the precipitated polymer particles. The rate of propagation of the polymerization reaction at the stage when dispersed particles are first formed is such that further units are being added to growing polymer chains at intervals on average not greater than 5 seconds.

Disclosure

This is a continuation-in-part of prior United States applications 367,884 and 367,885, both filed May 15, 1964, and both now abandoned.

This invention relates to dispersions of synthetic polymers in organic liquids and to methods of preparing such dispersions.

The invention is applicable to polymers in which the links between the monomers or comers forming the polymer involve atoms other than carbon. Such polymers, which may for convenience be termed heteroatomic polymers, include, for example, condensation polymers such as polyesters and polyamides and addition polymers such as polyoxymethylenes, polylactams and polyurethanes.

Dispersions of addition polymers in organic liquids may be made by polymerizing ethylenically unsaturated monomers in the organic liquid, the monomers being ones which are soluble in the liquid. The resulting polymer which must be insoluble in the liquid may be stabilized in the disperse particle form by carrying out the polymerization in the presence of a stabilizer which is a block or graft copolymer, one polymeric constituent of the copolymer being solvated by the organic liquid and another polymeric constituent being non-solvated by the organic liquid and becoming associated with the disperse polymer particles to anchor the stabilizer thereto.

Preferably the non-solvated polymeric constituent of the stabilizing copolymer is compatible with the disperse polymer in the proportions in which it is used and may well be of similar or the same constitution as the disperse polymer. In this latter case the stabilizing copolymer may be prepared in situ by having present in the organic liquid a polymeric material (hereinafter termed a "precursor") containing a polymeric constituent which is solvated by the organic liquid and a group which can take part in the polymerization of the monomer. In this way a minor part of the monomer being polymerized to form the disperse polymer can be copolymerized onto the precursor to form the desired block or graft copolymer for stabilizing the particles of polymer formed by polymerization of the major part of the monomer. In these circumstances the non-solvated anchor constituent of the stabilizer is identical with the main insoluble disperse polymer.

When applied to ethylenically unsaturated monomers, such processes of dispersion polymerization can form very useful dispersion of addition polymers characterized by a high degree of stability, i.e. freedom from flocculation, and by fine, uniform particle size. Average particle sizes of 1µ and less are readily obtainable.

After developing processes of making such dispersions of addition polymers over a period of several years it was thought that they might also be applicable to the making of stable dispersions of heteroatomic polymers. Accordingly the preparation of stable, fine-particle dispersions of common polyesters and polyamides as widely used in industry was attempted, but without success. For example, an attempt to make a dispersion of particles of a polyamide by reacting adipic acid and hexamethylene diamine in solution in high boiling (230–250° C.) aromatic hydrocarbon at reflux temperature in the presence of, as stabilizer precursor, a random copolymer of lauryl methacrylate and methacrylic acid (98:2 by weight, mol. wt. about 30,000) resulted in the formation of a coarse slurry of partially polymerized crystalline nylon/nylon salt mixture which rapidly settled out. A similar result was obtained when the precursor was a lauryl methacrylate copolymer containing amino groups.

Similarly, an attempt to make a dispersion of particles of a polyester, a poly(ethylene glycol terephthalate) extensively used in the manufacture of synthetic fibres, by refluxing a mixture of ethylene glycol and dimethyl terephthalate in aromatic hydrocarbon (boiling range 180–200° C.) in the presence of, as stabilizer precursor, the random carboxyl-containing lauryl methacrylate copolymer described above resulted in slow deposition of low molecular weight polymer in a coarse granular form which built up on walls of the reaction vessel.

Also, when ε-caprolactam was refluxed in hydrocarbon (boiling range 230/250° C.) in the presence of the carboxyl-containing lauryl methacrylate copolymer described above (as initiator and stabilizer precursor) and 0.5% phosphoric acid by weight (as catalyst) a slow deposition of coarse granules resulted.

In spite of all the available background knowledge of dispersion polymerization of ethylenically unsaturated monomers, stable fine-particle dispersions could not be made simply by applying this knowledge to industrial methods of making common polyamides and polyesters.

Continuing research work on dispersion polymerization of ethylenically unsaturated monomers disclosed that a critical stage in such processes was the "seed-stage," i.e. the stage at which the first very fine particles of disperse polymer are formed by precipitation of polymer from solution in the organic liquid in which it had been formed by polymerization of monomer. The particle size of the primary "seed" particles (so termed because most of the polymer subsequently formed is usually built up on these primary particles) and the rate at which they are formed were found to have a profound effect on the final dispersion.

It was then found that a satisfactory "seed" stage can be obtained in a dispersion polymerization of monomers or comers to form a heteroatomic polymer provided that the polymerization reaction by which the heteroatomic polymer is formed is being propagated sufficiently fast at that stage. The seed particles are precipitated when the low molecular weight polymer initially formed by solution polymerization of dissolved monomer grows by further reaction therewith of monomer or polymer units to such a molecular weight that it is no longer soluble in the organic liquid. Seed particles then appear in the liquid and give it a cloudy or milky appearance. Once such seed particles are formed the reaction can be continued to produce stable dispersions of the polymer of fine-particle size, i.e. of particle size on average not greater than 1µ.

In particular we have found that stable fine-particle dispersions of heteroatomic polymers in organic liquid may be made by a process of dispersion polymerization in the organic liquid provided that under the conditions of the reaction at the stage when dispersed particles of polymer are first formed the rate of propagation of the polymerization reaction is such that further units are being added to the growing polymer chains at intervals on average not greater than 5 seconds and preferably not greater than 0.5 second.

In the above-described unsuccessful attempts to make stable fine-particle dispersions of heteroatomic polymers the rate of propagation of the polymerization reaction at the seed stage was too slow. We have found that if, say, the polyester reaction is carried out using the acid chloride in the presence of an HCl acceptor then the rate of propagation is speeded up to such an extent that stable fine-particle dispersions of the polyester can be made.

Rates of propagation of polymerization reactions can be determined as described in text books such as:

Mechanism of Polymer Reactives by G. M. Burnett
Condensation Polymers by P. W. Morgan
High Polymeric Reactions by H. Mark and R. Ruff
Physical Chemistry of High Polymeric Systems by H. Mark and A. V. Tobolsky and methods of speeding up a polymerization reaction having a slow rate of propagation are well known. These include raising the temperature of the reaction, increasing the concentration of the monomers and comers using more vigorous initiators and catalysts of higher concentrations thereof and increasing the efficiency of removal of any by-products.

Mechanisms of formation of heteroatomic polymers fall broadly into two classes, referred to, for example by Mark and Tobolsky in "Physical Chemistry of High Polymeric Systems" as step-reaction polymerization and chain-reaction polymerization.

Typical polymerizations to which the processes of this invention can be applied are listed below. The first nine systems listed are illustrative of step-reactions and the remainder are illustrative of chain-reactions. The third column is relevant to in situ processes of stabilizer formation which are discussed in greater detail later in the specification.

When making the dispersion of heteroatomic polymers in organic liquid, the heteroatomic polymer is stabilized in disperse form by polymerizing it to form insoluble particles in the organic liquid in the presence of a block or graft copolymer having one polymeric constituent which is solvated by the organic liquid and another polymeric constituent of a different degree of polarity which is non-solvated by the organic liquid and becomes associated with the disperse polymer particles.

In this method, the organic liquid in which the heteroatomic polymer is formed and precipitated should be one in which the monomer or comers are sufficiently soluble for the polymerization reaction to take place therein, but in which the desired polymer is insoluble.

A solubility of only a few percent my weight is adequate but in most cases the monomer or comer is usually soluble to a higher degree. Where solubility is low, undissolved comer or monomer may be present dispersed in the liquid, so providing a reservoir of reactant. In some condensation polymerizations where one of the comers is much less soluble in the organic liquid than the other comer, use may be made of an interfacial polymerization technique. In this technique, the relatively insoluble comer is dissolved in a solvent for it which is immiscible with the organic liquid. This solution is then mixed with the organic liquid containing in solution the other comer and the stabilizing block or graft copolymer. The relatively insoluble comer then diffuses through the interface between the liquids and reacts in the organic liquid with the other comer to form polymer particles which are stabilized by the block or graft copolymer. The stable polymer dispersion in organic liquid is then separated from the other liquid. This technique is applicable only to cases where the polymerization reaction is a fast one so that the relatively insoluble comer is polymerized as soon as it enters the organic liquid. Preferably, the second liquid is one in which the by-product of the condensation polymerization is soluble. Water is a preferred liquid; for example, in some polyester reactions, the diol can be dissolved in an aqueous solution of the base such as sodium hydroxide, this aqueous solution then being mixed with the solution in a non-polar organic liquid of a dicarboxylic acid chloride and the stabilizing block or graft copolymer. The diol diffuses into the organic liquid and reacts with the acid chloride; the hydrogen chloride by-product passes into the aqueous phase where it is neutralized in solution. In general the technique can be applied to polyester and polyamide reactions.

In another method of making the dispersions in organic liquid, the heteroatomic polymer is produced in stabilized disperse form by polymerizing monomer or comers dis-

| Monomer or comers forming disperse polymer | Initiator, catalyst, etc. | Copolymerizable group of the precursor |
| --- | --- | --- |
| Diacid halide plus aliphatic diol | HCl acceptor, e.g. tertiary base | Aliphatic —OH. |
| Diacid halide plus aromatic diol | do | Acid chloride or aromatic —OH. |
| Diamine plus bischloroformates | do | Amine or acid chloride. |
| Diamine plus disulphonyl chloride | do | Do. |
| Diamine plus diacid halide | do | Do. |
| Diamine plus bisphosphinyl chloride | do | Do. |
| Alkyl or aryl halosilanes plus water or diols or diamines | do.[1] | OH or amine or halosilane e.g. as prepared by addition of halosilicon hydride to an olefinic C=C. |
| Diisocyanate plus diol | Organo-tin compounds | Hydroxyl. |
| Diisocyanates | Cyclic phospholene oxide | Copolymerizing isocyanate group, e.g. formed byreaction of diisocyanate with hydroxyethyl methacrylate copolymer. |
| Mono-isocyanates, e.g. phenyl isocyanate | n-Butyl lithium | |
| Aldehydes | Irradiation at low temperature | Copolymerizing aldehyde group. |
| Formaldehyde | With or without additional amine —70° C. upwards. | Basic group acting as initiator, e.g. dialkyl amino methacrylate; reaction product of amines or ammonia with a glycidyl methacrylate copolymer; N-vinyl pyrrolidone. |
| B-propiolactone | In hot solution with or without additional amine. | |
| Glycidyl ethers and esters, other epoxy compounds | Aluminium triisobutyl in hot solution | |
| Ethylene oxide, glycidyl ethers and esters, other epoxy compounds,[2] 3,3-bis-chloromethyl oxacyclobutane and other oxacyclobutanes; trioxane; tetrahydrofuran (in copolymers); dioxalane and other formals; lactones and other cyclic esters (carbonates, oxalates, etc.); formaldehyde. | Boron trifluoride (usually at temperatures between 0° C. and 100° C.). | Copolymerizing epoxy group, e.g. glycidyl methacrylate, or anhydride group, e.g. maleic anhydride; or hydroxyl (e.g. hydroxyethyl methacrylate) or carboxyl (e.g. methacrylic acid) as initiating or terminating group. |
| B-lactams, pyrrolidone, ε-caprolactam, propane sulpham, and other lactams. | Sodium hydride, sodium ethoxide, or sodium lactam; usually at temperatures above 100° C. | N-acyl lactam group acting as initiator, e.g. N-methacryloyl caprolactam in a copolymer. |

[1] Optional.

[2] Epoxy compounds used include styrene oxide, epichlorhydrin, blycidyl methacrylate, allyl glycidyl ether, phenyl glycidyl ether, glycidyl acetate.

solved in the organic liquid to form the polymer which is insoluble in the organic liquid and forms dispersed particles therein, the polymerization being carried out in the presence of a compound comprising a polymeric chain solvated by the organic liquid and a group or groups which will copolymerize with the monomer or comer, a minor proportion i.e. less than 50%, of the monomer or comer being copolymerized with the group or groups of the compound to attach non-solvated polymeric chain or chains thereto and form a block or graft copolymer in which the solvated polymeric chain is linked to non-solvated polymeric chain or chains at on average not more than two points. The polymer chains so linked to the solvated polymeric chains will be similar to those of the main insoluble polymer to be dispersed and so they also will be insoluble in, i.e. non-solvated by, the organic liquid. Since it is from the compound comprising the solvated polymeric chain that the stabilizing block or graft copolymer is formed in situ, it is convenient to term it the "precursor."

The stabilizing block or graft copolymer is itself stabilized in a soluble or micelle state in the organic liquid by the solvated polymeric constituent derived from the compound. It is believed that the other non-solvated polymeric constituents of the block or graft copolymer become associated with heteroatomic polymer in the disperse particles and that the solvated polymer chains of the block or graft copolymer stabilizes the dispersed insoluble polymer particles in the organic liquid.

In this specification the term "polymer" is used to describe the main heteroatomic polymeric material to be dispersed even though strictly speaking this may in some cases be a copolymer. The term "copolymer" is used to describe the stabilizing block or graft copolymers; these are copolymers which are not wholly a random arrangement of monomer units, but which comprise a polymeric chain to which is attached one or more polymeric chains of a different degree of polarity. The individual polymeric chains of the copolymer, herein termed "constituents," may themselves comprise one type of monomer unit or a random arrangement of two or more types of monomer units.

The choice of suitable organic liquid for the dispersion is determined to some extent by the polarity of the polymer to be dispersed since, in general, a polymer is insoluble in an organic liquid because it is of different polarity to that of the liquid and consequently is not solvated by it. It is preferred, however, that the organic liquid consists, as far as possible, of the relatively non-polar aliphatic and aromatic hydrocarbons, though in some cases it may be necessary to add a minor proportion of more polar liquid to the hydrocarbon to dissolve the monomers or comers used to make the polymer. The organic liquid should, of course, be inert with respect to the polymerization process.

The nature of the solvated polymeric constituent of the block or graft copolymer is determined by the nature of the organic liquid in which the heteroatomic polymer is to be dispersed. In contrast to the disperse polymer, this constituent should be of the same type of polarity as the organic liquid so that it is solvated by it.

This solvated polymeric constituent provides the stabilizing "envelope" around the disperse particles. The term "polymeric" implies that the constituent has a molecular weight of at least 1,000. In general, the higher the molecular weight of the solvated constituent the more effective is the stabilization but for most practical purposes it is in the range from 5,000 to $10^6$. Preferably it is at least 10,000 and the most suitable range is from 10,000 to 100,000.

Where the organic liquid is mainly aliphatic hydrocarbon in nature, the following are exampes of suitable polymeric constituents which would be solvated by the liquid:

Polymers of long chain esters of acrylic or methacrylic acid, e.g. stearyl, lauryl, octyl,
2-ethyl hexyl and hexyl esters of acrylic or methacrylic acid;
Polymeric vinyl esters of long chain acids, e.g. vinyl stearate;
Polymeric vinyl alkyl ethers;
Polymers of butadiene and isoprene and non-crystalline polymers of ethylene and propylene; and self polyesters of hydroxy long chain fatty acids e.g. 12—OH stearic acid.

Where the organic liquid is mainly aromatic hydrocarbon in nature, similar solvatable polymeric constituents may be used and, in addition, shorter chain analogues, e.g. polymers of ethoxy ethyl methacrylate, methyl methacrylate and ethyl acrylate or ethyl celluloses. Other polymeric constituents suitable for use in this type of organic liquid include:

Aromatic polyesters, e.g. oil-modified alkyd resin;
Aromatic polyethers, e.g. those sold under the trade name "Epikote";
Aromatic polycarbonates; and
Polymers of styrene and vinyl toluene.

Where the organic liquid is polar in nature, e.g. methyl or ethyl alcohol, suitable solvatable polymeric constituents include:

Polymers of acrylic or methacrylic acid;
Carboxymethyl celluloses;
Polyethylene or polypropylene glycols;
Hydroxylated polymers, e.g. polyvinyl alcohol or polymers of glycol monomethacrylates.

These examples listed above are merely illustrative of the principle to be followed in selecting suitable solvated constituents, i.e. that the polymer chains must be of similar polarity to that of the organic liquid.

Another polymeric constituent of the block or graft copolymer must be one which is non-solvated by the organic liquid, i.e. one which is of different polarity to that of the organic liquid and consequently is of different polarity to that of the solvated constituent of the copolymer. However, where the copolymer is preformed the size and degree of polarity of the two types of polymeric constituents are so balanced that initially the block or graft copolymer is in solution, either in molecular or micellar form, in the organic liquid. Preferably, the non-solvated polymeric constituent of the block or graft copolymer is of lower molecular weight than the solvated constituent. It is believed that, on precipitation of the heteroatomic polymer, the non-solvated constituents of the block or graft copolymer become part of the disperse particles. This may involve associative bonding between the non-solvated constituent and the newly formed heteroatomic polymer surface. The solvated constituents of the block or graft copolymer which becomes attached to the particles during their formation then serve to stabilize them in the organic liquid.

The non-solvated constituent of the block or graft copolymer may be of the same general chemical structure as the main heteroatomic polymer to be dispersed, but this is by no means a necessary requirement. For example, in some cases where for some reason such as economy it is necessary to use an organic liquid which is not sufficiently different in polarity from that of the heteroatomic polymer for it to be quite such a good non-solvent for the polymer as may be desired, fine particle dispersions may be obtained by using as the non-solvated constituent of the preformed stabilizer a polymeric chain whose polarity is more different from that of the organic liquid and which consequently is more insoluble than the heteroatomic polymer.

In the case of the non-solvated constituent of the stabilizing block or graft copolymer there are three main groups, (1) where the constituent is non-solvated because it is polar relative to the organic liquid, (2) where the constituent is non-solvated because it is non-polar relative to the organic liquid, and (3) where the constituent is non-solvated in all common organic liquids because of its molecular structure and irrespective of any question of relative polarity.

Systems typical of the first case are those in which the organic liquid is of a non-polar nature, the most common liquids of this type being aliphatic hydrocarbons, such as white spirit and isooctane. With very highly polar polymers slightly more polar organic liquids, such as aromatic hydrocarbons, fatty esters and fatty ketones may be used. The organic liquid may, of course, be a mixture provided that the mixture itself is of suitable polarity relative to the polymer.

Suitable polar polymeric constituents for use in systems of the first type include esters of unsaturated acids with lower alcohols, e.g. acrylic, methacrylic, and ethacrylic acid esters of methyl, ethyl and butyl alcohol. In homopolymers of such esters butyl alcohol is the highest alcohol which can be used and preferably this ester is used as a comonomer with a more polar monomer. Higher alcohols, e.g. octyl and lauryl, can be used provided the polymers also contain an additional polar group to compensate for the longer non-polar carbon-carbon chains. For example, the esters may be copolymerized with a minor proportion of a highly polar monomer such as acrylic or methacrylic acid. Monoesters of glycols having a free hydroxyl group may be used, the hydroxyl group providing an additional polar effect. Alternatively, the free hydroxyl group may be esterified with a polar acid such as acetic or formic or it may be etherified with a polar alcohol such as methanol, as illustrated by, e.g. β-ethoxy ethyl methacrylate. A similar result may be achieved using as the alcohol partial esters of glycerol or its derivatives.

A further alternative is to have present in the alcohol an amino group as, for example, in methanolamines and ethanolamines, an oxane ring as in glycidyl compounds, or a free carboxylic group as in a hydroxy acid such as citric acid.

Esters of these hydroxyl-containing materials with other unsaturated acids such as maleic, fumaric and itaconic, may be used, but since such esters are difficult to homopolymerize they are best used in conjunction with a major proportion of another suitably polar monomer.

In general, it is possible to incorporate in the polymeric constituent a minor proportion of a comonomer which by itself would not produce a sufficiently polar polymer.

A similar type of polar polymeric constituent is produced from a monomeric ester or ether of an unsaturated lower alcohol such as vinyl alcohol.

The esters may be of hydrofluoric acid and lower acids such as acetic, chloracetic, propionic and formic. Where higher acids are used then they should also contain an additional polar group to produce a sufficiently polar polymer, for example, the acid may be a dicarboxylic acid, such as oxalic, in which the second carboxylic group is left free or is esterified with a lower alcohol such as methyl or ethyl alcohol. Alternatively, the acid may contain a hydroxyl group, e.g. lactic or citric acid, the hydroxyl group being left free or reacted, e.g. acetylated. Or the acid may contain an amino group, e.g. glycollic acid may be used, the amino group providing the additional polarity required.

Similar principles are applicable to ethers of unsaturated lower alcohols. The ether may be a simple ether of a lower alcohol such as methyl or ethyl alcohol. Alternatively, polarity may be maintained by using an ether of a di- or trihydroxy alcohol of which a hydroxyl group is left free, or is esterified with a lower acid such as acetic or formic or is etherified with methanol. Alternatively, the ether may be of a dimethyl ethanolamine or diethyl ethanolamine or of a glycidyl compound.

Another type of polar polymeric constituent is produced by polymerizing an acid, such as acrylic or methacrylic. Alternatively, polar derivatives such as acid chlorides, amides, methylolamides, may be polymerized. Such monomers give particularly insoluble polymers and are suitable for copolymerizing with monomers which, by themselves, would not produce a satisfactorily non-solvated polymeric constituent.

The second type of system, makes use of polar organic liquids, such as methanol, ethanol, acetone, glycol and, in extreme cases, dimethyl formamide and methyl formate. Such polar organic liquids may contain a minor proportion of water. In this type of system the polymeric constituent should be relatively non-polar.

Polymers of hydrocarbons such as styrene, vinyl toluene, divinyl benzene, diisopropenyl benzene, isoprene, butadiene, isobutylene and ethylene, are suitably non-polar.

Other non-polar polymers are those of higher fatty esters of unsaturated acids such as acrylic, methacrylic and ethacrylic acids. In these cases, the alcohol component of the ester contains a long carbon-carbon chain to produce a polymer of suitable nonpolarity. Cetyl alcohol is a typical alcohol. Lauryl alcohol is about the lowest alcohol which can be used in homopolymer esters and preferably esters of this alcohol are used as comonomers with more non-polar monomer. In addition, one can use partial long-chain esters of a polyol, e.g. glyceryl distearate, dilaurate or dibehenate, the remaining hydroxyl of the glycerol being esterified with the unsaturated acid.

Alternatively, one can use in this second type of system higher fatty esters or ethers of unsaturated alcohols such as vinyl and allyl alcohol. Suitable acid components of such esters are stearic acid, behenic acid and monoesters of dibasic acids such as cetyl or lauryl adipate or sebacate.

Suitable ethers are those of cetyl alcohol or of glycerol distearate, dilaurate or dibehenate.

In general, in this second type of system the polymeric constituent is non-solvated by reason of it containing long carbon-carbon chains.

In the third type of system, the organic liquid may be of any polarity, e.g. aliphatic hydrocarbon, benzene or ethyl acetate. In this case, the polymeric constituent is non-solvated irrespective of its relative polarity. Such polymers include, for example, those of vinyl chloride, vinylidene chloride and acrylonitrile.

Where the block or graft copolymer is formed in situ by having a precursor present during the polymerization reaction, the non-solvated constituent is of course substantially identical with the main disperse polymer.

Where the dispersions are to be used in coating compositions it is preferred that the disperse polymer and the block or graft copolymer do not form an obviously heterogeneous film.

A suitable proportion of block or graft copolymer to use in the dispersion is in the range from 1% to 25% by weight of the disperse polymer and is preferably in the range from 2.5% to 10% by weight. The most suitable proportion will vary with the molecular weight of the solvated constituent of the copolymer. Higher proportions of stabilizer can be used but are unnecessary and wasteful.

Where the block or graft copolymer stabilizer is formed in situ, a minor proportion of the monomer or comer being polymerized in the organic liquid is copolymerized with the precursor to form the stabilizer. A suitable proportion of precursor to use is in the range 1% to 25% by weight of the monomer or comer to be polymerized, but usually not all of this precursor is converted into stabilizer by grafting monomer or comer thereon. In the case of in situ stabilization also it is unnecessary to produce copolymer stabilizer in a proportion greater than 25% by weight of the disperse polymer. In producing even as much as 25% by weight of copolymer stabilizer not more than 20% of the total monomer or comer at most is likely to be consumed, the remaining 80% or more being polymerized to form the disperse polymer to be stabilized by the copolymer.

In situ formation of copolymer stabilizer takes place in solution in the initial stage of the dispersion polymerization, and optionally continues thereafter, so that as in the case where preformed stabilizer is added at the beginning of the dispersion polymerization, when the main polymerization has proceeded to the stage at which the polymer becomes insoluble and is precipitated, the copolymer is available in the organic liquid to stabilize the polymer particles as they are formed.

This method is particularly suitable in the case of condensation polymers such as polyesters and polyamides, for example, those of aromatic dicarboxylic acids such as phthalic and its isomers, polyurethanes formed from diamines and bischloroformates, polysulphonamides formed from diamines and bissulphonyl chlorides and polycarbodi-imides from diisocyanates.

It is also particularly suitable in the case of addition polymers such as polyformals formed from formaldehyde or trioxane, polyethers formed from epoxides or lactones and polyurethanes formed from isocyanates.

Most of the above-mentioned polymers are insoluble in, and so can be dispersed in, non-polar organic liquids such as those consisting substantially of aliphatic or aromatic hydrocarbons. In these cases the solvatable constituent of the stabiliser is preferably one containing long fatty C—C chains, e.g. polylauryl methacrylate or polyvinyl stearate. The nature of the non-solvated constituent which is to be incorporated in the disperse polymer particles is a little more critical, but the following list indicates suitable combinations:

| Polymer | Non-solvated constituent of Stabilizer |
|---|---|
| Polyester or polyamide of a phthalic acid. | Polymethyl methacrylate or random copolymer with up to 15% methacrylic acid. |
| Polyformal from formaldehyde | Do. |
| Polyformal from trioxane | Do. |
| Polyethers | As either above or poly N-vinyl pyrrolidone. |

For example, by varying the proportion of methacrylic acid in the random copolymer with methyl methacrylate, the polarity of the non-solvated constituent may be varied. In this way one can select a constituent which is suitably non-solvated by any of a variety of organic liquids.

The more insoluble heteroatomic polymers, such as terephthalate polyester, isophthalate polyester and certain polyamides, may be dispersed in organic liquids which are more polar than aliphatic hydrocarbons, but which are still non-solvents for the polymers. For example, they may be dispersed in aromatic hydrocarbons or esters using, in the block or graft copolymer, a solvatable constituent which also is more polar in order to match the increased polarity of the organic liquid. Suitable constituents which would be solvated by the more polar liquids include polymethyl methacrylate and polystyrene. Suitable non-solvated constituents of such a block or graft copolymer include polyacrylonitrile and polymethacrylic acid.

Where the stabilizing block or graft copolymer is formed in situ the solvated polymeric constituent is provided by the precursor. Usually the precursor will be soluble in the organic liquid in which the dispersion is prepared. As stated above, the precursor must also contain copolymerizable groups.

The nature of the copolymerizable group of the precursor will depend on the nature of the monomers or comers from which the polymer is to be formed since it is with the reactive groups in these monomers or comers that the copolymerizable group is to react and so lead to the formation of one or more heteroatomic polymer chains on the precursor to form the block or graft copolymer. The term "copolymerizable group," therefore, includes not only groups which function as monomers, comonomers or comers in the polymerization reaction but also groups which function as initiators or terminators of the polymerization reaction.

Systems illustrative of the general principles involved have been listed above, the third column of the list indicating suitable groups in the precursor for copolymerization with a minor proportion of the monomer or comer.

Preferably the copolymerizable groups of the precursor and the copolymerizable groups of the main monomer or comers should have a reactivity ratio of between 0.1 and 10; better still, the ratio is about unity. If the reactivity ratio differs from unity, say by a factor of ten, then either the precursor will be used up too quickly, in which case it will be desirable to add precursor during the course of the polymerization, or the copolymerization with the precursor will tend to be too slow, in which case it will be desirable to speed up the copolymerization by increasing the number of copolymerizable groups in it.

One way of providing a number of copolymerizable groups on the precursor molecule without involving the risk of attaching heteroatomic polymer chains to the solvated polymeric chain at more than two points on average is to use as a precursor a block or graft copolymer of which one polymeric chain is solvated by the organic liquid and another polymeric chain provides the copolymerizable groups. These latter polymeric chains of the block or graft copolymer need not necessarily be solvated by the organic liquid.

This use of copolymeric precursor is particularly advantageous in that embodiment of the invention in which the copolymerizable groups function as an initiator of the polymerization reaction. In that case, part or all of the initiator required in the reaction may be provided by groups contained in a polymeric chain attached to the solvated polymeric chain of the precursor with the result that the heteroatomic polymer chains will grow from a multiplicity of points on a polymeric chain which in turn is attached to only one point on the stabilizing solvated polymeric chain. Since on average there may be up to two points on the solvated polymeric chain to which heteroatomic chains are attached, the precursor may contain on average up to two polymeric chains containing copolymerizable groups.

For example, formaldehyde may be polymerized in aliphatic hydrocarbon at temperatures from −70° C. upwards in the presence of a polydialkylaminoethyl methacrylate/polylauryl methacrylate block or graft copolymer. In this case, the polylauryl methacrylate constituent of the copolymer provides the solvated polymeric chain and the alkylamino groups of the other polymeric constituent provide basic groups which will initiate polymerization of the formaldehyde. β-Propiolactone may be polymerized in hot aliphatic hydrocarbon using the same type of block or graft copolymer to provide a stabilizing polymeric chain and another chain containing initiator groups.

Similarly, formaldehyde may be polymerized in aliphatic hydrocarbon at temperatures from −70° C. upwards in the presence of a poly N-vinyl pyrrolidone/polylauryl methacrylate block or graft copolymer.

Lactams may be polymerized in non-polar organic liquid using sodium ethoxide, sodium hydride or sodium caprolactam catalyst in the presence of N-methacryloyl-caprolactam-methyl methacrylate/polylauryl methacrylate block or graft copolymer in which the polylauryl methacrylate constituent is solvated by the organic liquid, and the other polymeric constituent is a random copolymer chain in which the N-acyl lactam groups initiate polymerization of the lactam monomer.

Glycidyl ethers and esters and other epoxy monomers may be polymerized in non-polar organic liquid using boron trifluoride catalyst in the presence of polyglycidyl methacrylate/polylauryl methacrylate block or graft copolymer. In this case, the glycidyl groups of the copolymer copolymerize with the epoxy groups of part of the main monomer.

The more insoluble heteroatomic polymers, such as terephthalate polyesters, isophthalate polyesters and certain polyamides, may be dispersed in organic liquids which are more polar than aliphatic hydrocarbons but which are still non-solvents for the polymers. They may be polymerized and dispersed, for example, in aromatic hydrocarbons or esters using more polar solvated polymeric chains in the precursor, e.g. polymethyl methacrylate or polystyrene. The copolymerizable groups may be attached to the polymeric chain by copolymerizing, say, styrene with methacryloyl-chloride or by copolymerizing methyl methacrylate with a small proportion of glycidyl methacrylate.

The dispersions have much improved rheological characteristics as compared with dispersions made by forming a polymer in aqueous phase and then dispersing it in an organic liquid using a conventional stabilizing agent. Because they are essentially non-flocculated they may contain higher proportions of dispersed polymer and still retain Newtonian flow characteristics. Dispersions can still be free-flowing at polymer contents of 50% by weight and higher. In addition, they provide finer particle size and wider ranges of molecular weight than were available by the old process, these two factors also being of particular importance in coating compositions in that together with the improved rheological characteristics they make possible the formulation of coating compositions which yield glossy pigmented films. Pigments and plasticizers may be incorporated in the coating composition in the various ways common in the art. The dispersions may also be used in other ways, for example in forming fibres impregnating fabrics and porous materials, casting films, etc.

Further, in contrast with dispersions formed by polymerization in aqueous medium which are contaminated by conventional emulsifying and stabilizing agents, often of an ionic nature, the disperse polymers of the present invention may contain only a small proportion of copolymer. They may, therefore, be coagulated, dried or otherwise separated from the liquid phase, to produce polymers with improved physical and electrical characteristics.

The following Examples 1–26 illustrate embodiments of the invention in which the stabilizing copolymer is formed in situ using a precursor.

EXAMPLE 1

(a) Preparation of precursor bearing aliphatic —OH group

A mixture of 299.7 parts of n-octyl methacrylate and 33.3 parts of ethylene glycol monomethacrylate together with 6.6 parts of azodiisobutyronitrile dissolved in 333 parts of methyl ethyl ketone was added at a constant rate over two hours to a refluxing solution of 6.6 parts of azodiisobutyronitrile in 333 parts of methyl ethyl ketone. The final charge was refluxed for a further hour; the non-volatile content was then 31–32%. The polymer was purified by precipitation in a large excess of methanol, dried and redissolved in benzene to give a viscous syrup of 80% non-volatile content. The reduced viscosity of the polymer measured at 0.5% concentration in benzene at 25° C. was 0.08 and the estimated functionality with respect to the number of aliphatic hydroxyl groups per chain was of the order of 10 (based on the number average molecular weight of the polymer).

(b) Preparation of stabilized dispersion of aromatic polyester

A solution of 15.23 parts of isophthaloyl dichloride and 15.23 parts of terephthaloyl dichloride together with 21.5 parts of the stabilizer precursor solution prepared in 1(a) above in 250 parts of ethyl acetate was prepared in a reactor equipped with a mechanical stirrer, nitrogen inlet, two dropping funnels and a water condenser fitted with a calcium chloride guard tube. 2.81 parts of 2,6-lutidine was added and the mixture refluxed for an hour. Then 80% (by volume) of a solution prepared from 33.17 parts of bis(4-hydroxyphenyl)-2,2-propane in 100 parts of ethyl acetate was added, followed immediately by 30.9 parts of 2,6-lutidine and finally by the remaining 20% of the diol solution. Refluxing was maintained for a further hour. The final product was filtered to remove coarse granular residue leaving a dispersion of polyester as filtrate. The dispersed polymer had a reduced viscosity of 0.6 measured at 0.5% concentration in chloroform at 25° C. and a particle size range of from 0.5–1μ.

EXAMPLE 2

(a) Preparation of precursor bearing phenolic —OH group 145 parts of p-aminophenol hydrochloride was dissolved in 400 parts of 4 N caustic soda solution. The mixture was heated on a steam bath and 131 parts of methacryloyl chloride quickly added. The mixture was heated for a further 15 minutes, cooled to room temperature, and the desired N-acyl methacrylate isolated by filtration. A random solution copolymer was prepared by refluxing a mixture of 16.6 parts of the monomer with 149.8 parts of n-octyl methacrylate and 325 parts of ethyl acetate in the presence of 0.3 part of azodiisobutyronitrile. Three further equal additions of azodiisobutyronitrile (each of 1.0 part) were made at 90 minute intervals. At this stage, the non-volatile content of the reaction product was 31%. Any residual monomer was removed by precipitation of the total reaction product in excess methanol. The isolated polymer was dried and redissolved in benzene to give a solution of 20% non-volatile content and a reduced viscosity measured at 0.5% concentration in benzene at 25° C. of 0.28 corresponding to about 40 phenolic hydroxyl residues per molecule.

(b) Preparation of a stabilized dispersion of a polyester 30.45 parts of isophthaloyl dichloride and 13.8 parts of the precursor solution prepared in 2(a) were dissolved in 140 parts of chloroform and refluxed in atmosphere of nitrogen, using the apparatus of Example 1(b). 0.3 part of 2,6-lutidine was added and the mixture refluxed for a further hour. A solution of 34.03 parts of bis-(4-hydroxyphenyl)-2,2-propane in 20 parts of 2,6-lutidine and 150 parts of chloroform was added quickly to the refluxing charge followed immediately by the further addition of 13.4 parts of 2,6-lutidine. The mixture was refluxed for 2 hours, cooled to room temperature and filtered to remove a few coarse particles. The resultant creamy latex obtained as the filtrate was extracted three times with water to remove the base hydrochloride by-product and the organic phase dried over anhydrous sodium sulphate to yield, after filtration, a creamy, fine particle size latex, of good storage stability. Particle size was about .3–.5μ.

EXAMPLE 3

(a) Preparation of precursor bearing aromatic hydroxyl group

A solution copolymer was prepared by adding 323 parts of lauryl methacrylate and 10 parts of glycidyl methacrylate together with 5 parts of benzoyl peroxide paste (60% solids content in mixed phthalate esters) at a constant rate over 5 hours to a refluxing solvent mixture of 333 parts of petroleum spirit, boiling range 100–120° C., and 333 parts of petroleum spirit, boiling range 70–90° C. The mixture was refluxed for a further hour and then 1 part lauryl dimethylamine (Armeen DMCD) was added and the batch refluxed for another hour to destroy the residual peroxide initiator. At this stage, the non-volatile content of the batch corresponded to better than 90% conversion. The polymer was precipitated three times from excess methanol, dried and redissolved in butyl acetate to give a homogeneous solution of 33% solids content. The reduced viscosity of the copolymer at 0.5% concentration in benzene at 25° C. was 0.11 corresponding to an approximate viscometric average molecular weight of 38,000 with about 5 glycidyl residues per molecule calculated on this basis. 300 parts of this copolymer solution in butyl acetate was refluxed under nitrogen with 1 part of lauryl dimethylamine and 3 parts of p-hydroxybenzoic acid until the measured drop in the acid value of the mixture corresponded to a functionality with respect to introduced phenolic hydroxyl group of about 1.2 calculated on the basis of the approximate number average molecular weight of the polymer. The stabilizer precursor was precipitated in excess methanol, dried on a vacuum hotplate and redissolved in chloroform to give a stabilizer precursor solution of 46% non-volatile content.

(b) Preparation of a stabilized dispersion of an aromatic polyester

A solution of 30.45 parts of isophthaloyl dichloride in 150 parts of chloroform and 5.85 parts of the stabilizer precursor solution prepared in 3(a) above was heated to reflux temperature and 0.04 part of 2,6-lutidine added. The charge was refluxed for an hour and a solution of 34.18 parts of bis-(4-hydroxyphenyl)-2,2-propane in 150 parts of chloroform and 20 parts of 2,6-lutidine was added at a constant rate over 15 minutes. Immediately after the addition 13.31 parts of 2,6-lutidine was added and the mixture refluxed for a further hour. Repeated aqueous extraction of the reaction product with water removed the base hydrochloride by-product and the organic phase, after drying over anhydrous sodium sulphate, was obtained as a stable, fine particle size dispersion.

EXAMPLE 4

(a) Preparation of precursor bearing 2 aromatic hydroxyl groups at each attachment point A solution copolymer was prepared by adding 990 parts of lauryl methacrylate and 10 parts of glycidyl methacrylate together with 3.75 parts of benzoyl peroxide paste (60% solids content in mixed phthalate esters) to a refluxing mixture of 1900 parts of butyl acetate and 100 parts of ethyl acetate over 5 hours at a constant rate. The charge was then refluxed for an hour, 3 parts of lauryl dimethylamine were added and refluxing continued for a further hour to destroy the residual peroxide initiator. The estimated non-volatile content of the product was 20%. The polymer was precipitated three times from methanol, dried and redissolved in butyl acetate to give a solution with a non-volatile content of 40%. The reduced viscosity of the polymer measured at 0.5% concentration in benzene at 25° C. was 0.2 corresponding to an approximate viscometric average molecular weight of 85,000 and about 4 glycidyl residues per chain. 2.5 parts of lauryl dimethylamine and 10 parts of 4,4'-bis(4-hydroxyphenyl)pentanoic acid (diphenolic acid) were added and the mixture refluxed until the acidity of the charge indicated that sufficient of the glycidyl groups in the copolymer had been ring-opened to correspond to a functionality with respect to diphenolic acid residues of about 1.1 based on a number average molecular weight of the copolymer. The final non-volatile content of the stabilizer precursor was 38%.

(b) Preparation of stabilized dispersion of an aromatic polyester

A solution of 30.45 parts of isophthaloyl dichloride and 7.1 parts of the stabilizer precursor solution 4(a) in 150 parts of chloroform was heated to reflux temperature and 0.03 part of 2,6-lutidine added. After an hour at reflux, a solution of 34.18 parts of bis(4-hydroxyphenyl)-2,2-propane in 150 parts of chloroform and 20 parts of 2,6-lutidine was added followed immediately by a further 13.7 parts of 2,6-lutidine. The reaction mixture was refluxed for an hour. The base hydrochloride by-product was removed by aqueous extraction and the resultant fine particle size dispersion was concentrated to a non-volatile content of 47% by reduced pressure distillation at 60° C. and a pressure of about 20 mm. of mercury.

EXAMPLE 5

(a) Preparation of precursor bearing acid chloride groups

A charge of 315.7 parts of methyl methacrylate, 17.3 parts of methacryloyl chloride and 0.83 part of azodiisobutyronitrile in 666.7 parts of ethyl acetate was heated at a reflux under nitrogen for 5 hours, all outlets to the atmosphere being via calcium chloride tubes. At this stage, the non-volatile content of the solution was 30% and the reduced viscosity of the polymer measured at 0.5% concentration in ethylene dichloride at 25° C. was 0.23, corresponding to an approximate viscometric average molecular weight of 75,000 and an estimated number of acid chloride residues per molecule of 20.

(b) Preparation of stabilized polyester dispersion

A solution consisting of 34.2 parts of bis(4-hydroxyphenyl)-2,2-propane and 48 parts of stabilizer precursor solution 5(a) in 60.3 parts of ethyl acetate was prepared in the apparatus described in Example 1(b). 1.76 parts of 2,6-lutidine was added and the mixture heated at reflux for an hour. Then 90% (by volume) of a solution containing 14.8 parts of terephthaloyl dichloride and 14.8 parts of isophthaloyl in 250 parts of ethyl acetate was added and followed by 30 parts of 2,6-lutidine. Finally the remainder of the acid chloride solution was added, then a further 2 parts of 2,6-lutidine together with a solution of 0.34 part of bis(4-hydroxyphenyl)-2,2-propane in 1 part of ethyl acetate. The charge was refluxed under nitrogen for a further hour and then filtered to remove 50 parts of coarse granular material and leave stable dispersion of polyester with a reduced viscosity measured at 0.5% concentration in chloroform at 25° C. of 0.3.

EXAMPLE 6

(a) Preparation of precursor bearing glycidyl group

A mixture of 2 parts glycidyl methacrylate, 198 parts lauryl methacrylate, 200 parts petroleum ether of boiling range 60–80° C., and 0.7 part azodiisobutyronitrile was refluxed for 8 hours in an atmosphere of nitrogen. The product was a 48.5% solution of polymer which after precipitation with methanol and drying in vacuo, showed a reduced viscosity of 0.45 in 0.5% solution in benzene at 25° C.

(b) Preparation of dispersions of ethylene oxide polymer

A mixture of 10 parts of the stabilizer precursor prepared in Example 6(a) and 200 parts n-hexane was shaken vigorously with 0.6 part boron trifluoride etherate. Ethylene oxide was bubbled into the liquid at room temperature for one hour. A stable dispersion of fine particle size was obtained of 21% total solids.

EXAMPLE 7

Preparation of dispersion of trioxane polymer

A mixture of 15 parts of the stabilizer precursor prepared in Example 6(a) and 15 parts cyclohexane was shaken vigorously with 0.5 part boron trifluoride etherate, warmed to 55° C., and mixed with a solution of 50 parts trioxane in 160 parts cyclohexane at 55° C. A dispersion began to form immediately. After 15 minutes at 55° C., the mixture was maintained at 40° C. for 4 hours when a stable, but slightly viscous, 26% solids, dispersion of fine particle size was obtained.

EXAMPLE 8

Preparation of dispersion of β-propiolactone polymer 1 part of the stabilizer precursor prepared in Example 6(a) was diluted with 4 parts cyclohexane and shaken with 0.05 part boron trifluoride etherate. The clear solution was diluted with 25 parts cyclohexane, added to 5 parts β-propiolactone, and shaken vigorously for half an hour. Some larger particles and polymerized droplets were readily removed by decanting and filtering, yielding a fine particle size stable dispersion of 10% solids.

EXAMPLE 9

(a) Preparation of precursor bearing glycidyl group

A mixture of 9.9 parts lauryl methacrylate, 0.1 part glycidyl methacrylate, 2 parts azodiisobutyronitrile and 200 parts petroleum ether of boiling range 60–80° C. was refluxed in an atmosphere of nitrogen. A mixture of 1.9 parts glycidyl methacrylate, 188.1 parts lauryl methacrylate, and 1 part azodiisobutyronitrile was fed in at constant rate over 3½ hours, beginning 15 minutes after refluxing had started. After all the feed had been added, the mixture was refluxed for a further 1½ hours.

The product was a 42.2% solution of polymer which after precipitation with methanol and drying in vacuo, showed a reduced viscosity of 0.17 in 0.5% solution in benzene at 25° C.

(b) Preparation of dispersion of glycidyl acetate polymer

A mixture of 10 parts of the stabilizer precursor prepared in Example 9(a) and 50 parts n-heptane was mixed with 0.3 part boron trifluoride etherate in a flask fitted with a high speed stirrer and a dropping funnel. A mixture of 0.5 part glycidyl acetate and 50 parts n-heptane was added and a fine particle size dispersion began to form. After 20 minutes, the flask was warmed to 45° C. and maintained at this temperature while 50 parts of glycidyl acetate were added at constant rate over a total of 2 hours. During this period four further additions, each of 0.3 part boron trifluoride etherate mixed with 3 parts anisole, were made at half-hourly intervals. When addition of monomer feed was complete, the mixture was maintained at 45° C. for a further half-hour, then cooled to room temperature and decanted from a small proportion of coarse polymer sticking to the walls of the flask. A fine particle size dispersion of 31% solids resulted.

EXAMPLE 10

Preparation of dispersion of phenyl glycidyl ether polymer

A mixture of 10 parts of the stabilizer precursor prepared in Example 9(a) and 20 parts cyclohexane was shaken with 0.3 part boron trifluoride etherate. To this were added 3 parts phenyl glycidyl ether in 180 parts cyclohexane. A very fine particle size dispersion formed immediately. After 15 minutes, the dispersion was stirred rapidly while 100 parts of phenyl glycidyl ether were added at constant rate over a total of 2 hours. A fine particle size dispersion of 33% solids resulted.

EXAMPLE 11

Preparation of dispersion of epichlorhydrin polymer

A mixture of 10 parts of the stabilizer precursor prepared in Example 9(a) and 40 parts n-hexane was shaken with 0.3 part boron trifluoride etherate. A mixture of 50 parts epichlorhydrin and 450 parts n-hexane was added with thorough mixing. A fine particle size dispersion began to form immediately and after allowing to stand for several hours was found to be of 10% solids.

EXAMPLE 12

Preparation of dispersion of copolymer of bis-chloromethyl oxacyclobutane and phenyl glycidyl ether A monomer mixture was prepared from 5 parts phenyl glycidyl ether and 40 parts 3,3-bischloromethyloxacyclobutane.

10 parts of the stabilizer precursor prepared in Example 9(a) and 20 parts n-heptane were mixed with 0.3 part boron trifluoride etherate in a flask fitted with stirrer and dropping funnel. To this were added 5 parts of the monomer mixture dissolved in 65 parts n-heptane. A fine particle size dispersion rapidly formed at room temperature.

After 20 minutes the solution was warmed to 50° C. and maintained at this temperature over 2 hours while the remainder of the monomer mixture was fed in at constant rate, with thorough stirring. When addition was complete, the mixture was kept at 50° C. for one hour and then allowed to cool. A stable dispersion of 31% solids resulted.

EXAMPLE 13

(a) Preparation of precursor bearing glycidyl group

Example 9(a) was repeated using a monomer ratio of 98 parts lauryl methacrylate to 2 parts glycidyl methacrylate instead of 99:1 in both initial charge and feed.

The product was a 52.3% solids solution of polymer which after precipitation with methanol and drying in vacuo, showed a reduced viscosity of 0.16 in 0.5% solution in benzene at 25° C.

(b) Preparation of dispersion of phenyl glycidyl ether polymer

A mixture of 10 parts of the stabilizer precursor prepared in Example 13(a), 5 parts phenyl glycidyl ether and 45 parts n-hexane, was placed in a flask fitted with stirrer, reflux condenser and nitrogen inlet. Air was displaced by nitrogen and approximately 1 part aluminum triisobutyl was added. No reaction occurred at room temperature, but on refluxing for 2 hours rapid whitening took place with the formation of a stable dispersion of 17% solids.

EXAMPLE 14

(a) Preparation of precursor bearing aliphatic hydroxyl group

A mixture of 331.7 parts n-octyl methacrylate, 1.3 parts ethylene glycol monomethacrylate, 666 parts methyl ethyl ketone and 0.23 part azodiisobutyronitrile was refluxed for a total of 6 hours. Three further portions of azodiisobutyronitrile of 0.2 part each were added at intervals of 1½ hours during the refluxing period.

The polymer was precipitated at an oily liquid by pouring into a large excess of methanol, separated and taken up in petroleum ether of boiling range 60–80° C. The precipitation was repeated three times and the product finally taken up in benzene to yield a 55% solution.

The reduced viscosity of an 0.5% solution in benzene at 25° C. was 0.18.

(b) Preparation of dispersion of phenyl glycidyl ether polymer

A mixture of 10 parts of the stabilizer precursor prepared in Example 14(a) and 13 parts petroleum ether of boiling range 60–80° C. was shaken with 0.3 part boron trifluoride etherate. To this was added a mixture of 20 parts phenyl glycidyl ether in 300 parts petroleum ether of boiling range 60–80° C. A stable, very fine particle size dispersion formed at once.

After 15 minutes, a further 40 parts phenyl glycidyl ether mixed with 100 parts petroleum ether of boiling range 60–80° C. were warmed to obtain a homogeneous solution (45–50° C.) and added to the dispersion with thorough stirring. After allowing to stand for 1 hour, a stable, fine particle size dispersion, of 13% solids was obtained.

EXAMPLE 15

(a) Preparation of precursor bearing acid anhydride group

A mixture of 95 parts vinyl stearate, 5 parts maleic anhydride, 100 parts petroleum ether of boiling range 60–80° C. and 1 part azodiisobutyronitrile was refluxed for 7 hours. 0.5 part azodiisobutyronitrile was added and the mixture refluxed for a further four hours, allowed to cool and filtered.

The product was a 36% polymer solution.

(b) Preparation of dispersion of trioxane polymer

A mixture of 10 parts of the stabilizer precursor prepared in Example 15(a) and 20 parts petroleum ether of boiling range 60–80° C. was shaken with 0.6 part boron trifluoride etherate, yielding a clear solution. A solution of 50 parts trioxane in 1100 parts petroleum ether of boiling range 60–80° C. was added with thorough mixing.

Slow whitening began almost at once, and after 10 minutes the mixture was maintained at 40° C. for 5 hours. A stable dispersion of very fine particle size resulted.

EXAMPLE 16

(a) Preparation of precursor bearing glycidyl group

Example 6(a) was repeated using 2 parts azodiisobutyronitrile and a reaction time of 5 hours. The product was a 48.5% solution of polymer which, after precipitation with methanol and drying in vacuo, showed a reduced viscosity of 0.27 in 0.5% solution in benzene at 25° C.

(b) Preparation of dispersion of trioxane polymer

A mixture of 4 parts of the stabilizer precursor prepared in Example 16(a) and 12 parts cyclohexane was shaken vigorously with 0.12 part boron trifluoride etherate and placed in a flask fitted with an efficient stirrer. A solution of 1 part trioxane in 23.5 parts cyclohexane was added and the stirrer started. Within about a minute a very fine particle size dispersion began to form. After 15 minutes the flask was warmed to 60° C. and maintained at this temperature for three hours while a mixture of 40 parts trioxane and 40 parts cyclohexane, also at 60° C. was fed in at constant rate, the feed tube dipping under the surface of the liquid. After continuing heating at 60° C. for a further hour the product was a stable dispersion of 30% solids.

EXAMPLE 17

(a) Preparation of precursor bearing carboxyl group

A mixture of 250 parts ethyl acetate and 250 parts of a mainly aliphatic hydrocarbon fraction of boiling range 180–200° C. was heated to reflux. Over 5 hours a mixture of 250 parts ethyl acetate, 1.25 parts azobiscyanovaleric acid and 1.05 parts thioglycollic acid was added at constant rate, and simultaneously a separate feed of 500 parts lauryl methacrylate was added, so that both feeds were completed at the same time. Refluxing was continued for 2 hours, by which time the solids content was 31.2%.

The product was precipitated three times in methanol and taken up in n-hexane to give a 10% solution.

The reduced viscosity of the polymer in butyl acetate at 23° C. was 0.16.

(b) Preparation of dispersion of trioxane polymer 10 parts of the stabilizer precursor prepared in Example 17(a) were mixed with 0.1 part boron trifluoride etherate to give a clear solution. 4 parts trioxane in 100 parts n-hexane were added with thorough mixing. Whitening began almost immediately and after standing at room temperature for 16 hours, a stable dispersion of fine particle size was obtained with substantially quantitative conversion to polymer.

EXAMPLE 18

(a) Preparation of precursor bearing alkylamino group

A mixture of 2 parts β-diethylaminoethyl methacrylate, 198 parts lauryl methacrylate, 200 parts petroleum ether of boiling range 60–80° C., and 0.67 part azodiisobutyronitrile was refluxed on a steam bath for 7 hours in an atmosphere of nitrogen. The product was a 46.7% solution of polymer which, after precipitation with methanol and drying in vacuo, showed a reduced viscosity of 0.44 in 0.5% solution in benzene at 25° C.

(b) Preparation of dispersion of formaldehyde polymer

Pure formaldehyde, generated by heating 250 parts of methyl cyclohexyl formal at 150° C. and passing the vapor through purification traps at −15° C., was diluted with nitrogen and passed into a reaction vessel at −76° C. containing a stirred mixture of 100 parts n-hexane and 16 parts of the random copolymer of lauryl methacrylate and diethylaminoethyl methacrylate prepared in Example 18(a). After 4 hours a dispersion of very low polymer solids had formed; in fact, it was little more than an opalescence, but it was extremely stable.

EXAMPLE 19

(a) Preparation of block copolymer precursor bearing dialkylamino groups

A mixture of 92 parts of the methacrylated polylauryl methacrylate solution prepared in Example 1(a), 11.1 parts of diethylaminoethyl methacrylate, 50.6 parts ethyl acetate and 0.38 part azodiisobutyronitrile was heated under reflux for 2 hours, than a further 0.18 part azodiisobutyronitrile was added and refluxing continued for 3 hours. The product was a clear, pale brown, solution of 25.5% solids.

(b) Preparation of dispersion of formaldehyde polymer

Example 18(b) was repeated replacing the random copolymer by an equal weight of the block copolymer of lauryl methacrylate and diethylaminoethyl methacrylate prepared in Example 19(a). A stable, white, dispersion was formed over a period of 4 hours, the total solids being 14%.

A similar experiment, replacing the block copolymer with an equal weight of 73:27 random copolymer of lauryl methacrylate and diethylaminoethyl methacrylate, of similar overall composition and molecular weight to the block graft copolymer resulted in somewhat more rapid reaction than when using the block graft copolymer, but yielded a fine granular or powdery precipitate which settled almost immediately. This is a result of attaching heteroatomic polymer chains at too many points along the solvated polymeric chain of the precursor.

EXAMPLE 20

Preparation of dispersion of β-propiolactone polymer 20 parts of the block graft copolymer solution of diethylaminoethyl methacrylate and lauryl methacrylate prepared in Example 19(a) were diluted with 100 parts n-hexane and refluxed in a flask fitted with stirrer, reflux condenser and dropping funnel. 2 parts β-propiolactone were added; this dissolved to yield a clear solution at first, then formed a fine particle size dispersion of polymer. After refluxing for half an hour β-propiolactone was added at constant rate over 6 hours, a total of 56 parts being used. When addition was complete, refluxing was continued for 2 hours and the product was then cooled and filtered to remove traces of bitterness.

A stable, fine particle size, dispersion of 33% solids resulted.

A similar experiment replacing the block copolymer with an equal weight of the 99:1 random copolymer prepared in Example 18(a) only very slowly formed a stable, but rather coarse, dispersion after the first monomer addition. Polymerization was far too slow to permit a convenient feed rate without massive build-up of a layer of liquid monomer in which further polymerization took place.

An attempt to accelerate the reaction by adding 2 parts of lauryl dimethyl amine produced only coarse unstable polymer dispersion. This was because the added amine accelerated polymerization of the main monomer without accelerating the concurrent copolymerization with the precursor.

EXAMPLE 21

(a) Preparation of block copolymer precursor bearing pyrrolidone groups

A mixture of 92 parts of the methacrylated polylauryl methacrylate solution prepared in Example 1(a), 6.66 parts N-vinyl pyrrollidone, 50.6 parts ethyl acetate and 0.38 part azodiisobutyronitrile was heated under reflux for 2 hours, then a further 0.18 part azodiisobutyronitrile was added and refluxing continued for 3 hours.

The product was an opalescent polymer solution of 24% total solids.

(b) Preparation of dispersion of formaldehyde polymer

Example 18(b) was repeated using the block copolymer of N-vinyl pyrrolidone and lauryl methacrylate prepared in Example 21(a) in place of the diethylaminoethyl methacrylate block graft copolymer. A very similar result was obtained.

EXAMPLE 22

(a) Preparation of block copolymer precursor bearing cyclic oxide group

Example 21(a) was repeated, replacing N-vinyl pyrrolidone by a mixture of 2.0 parts methyl methacrylate and 1.8 parts N-methacryloyl caprolactam (prepared by reacting caprolactam and methacryloyl chloride). The product was a slightly opalescent polymer solution of 22.5% solids.

(b) Preparation of dispersion of ε-caprolactam polymer 22 parts ε-caprolactam, 0.5 part sodium metal, and 40 parts of a mixed aliphatic and aromatic hydrocarbon fraction of boiling range 170–190° C. were warmed in a flask fitted with reflux condenser until all the sodium had dissolved. 10 parts of the solution of block graft of polylauryl methacrylate with a copolymer of N-methacryloyl caprolactam and methyl methacrylate prepared in Example 22(a) were added and the mixture refluxed. After initially forming a clear solution, the liquid became cloudy, and after refluxing for 4 hours, a stable dispersion was obtained, with, however, only partial conversion of monomer to polymer.

EXAMPLE 23

Preparation of dispersion of 3,3-dimethylazetidinone polymer 20 parts of cyclohexane, 20 parts of benzene, 10 parts of the solution of block graft of polylauryl methacrylate with a copolymer of N-methacryloyl caprolactam and methyl methacrylate prepared in Example 22(a), and 0.5 part potassium pyrrolidone were refluxed in a flask fitted with reflux condenser, stirrer and dropping funnel. 20 parts of 3,3-dimethylazetidinone were added at constant rate over 3 hours, and refluxing continued for a further half hour. A stable, fine particle size, dispersion of 32% solids was obtained.

EXAMPLE 24

(a) Preparation of block copolymer precursor bearing glycidyl groups 19 parts of lauryl methacrylate, 1 part of glycidyl methacrylate, 2 parts of azodiisobutyronitrile, 266 parts ethyl acetate and 133 parts butyl acetate were heated to reflux in a flask fitted with stirrer, reflux condenser and sampling tube. Over 3 hours, a mixture of 361 parts lauryl methacrylate, 19 parts glycidyl methacrylate and 2 parts azodiisobutyronitrile was added at constant rate. The mixture was refluxed for a further 75 minutes and cooled to room temperature.

The polymer was precipitated three times from methanol and taken up in butyl acetate. At this stage the solids content of the solution was 45.8% and the reduced viscosity of the polymer in butyl acetate at 23° C. was 0.12.

1.38 parts of methacrylic acid, 0.43 part of lauryl dimethylamine and 0.003 part of hydroquinone were added to polymer solution and the acid value was found to be 1.87 mg. KOH/gm. The mixture was now heated to reflux at 120° C. until the acid value determined on samples taken at intervals dropped to 0.998 mg. KOH/gm. This took 2½ hours.

The product was a 45.8% solution of polymer with an estimated viscometric average molecular weight of 84,000 and an average of 2.86 free methacrylate groups per molecule calculated on this basis.

A mixture of 109 parts of this methacrylated polylauryl methacrylate solution, 2.5 parts glycidyl methacrylate, 121 parts ethyl acetate, and 0.2 part azodiisobutyronitrile was refluxed under nitrogen for 4½ hours with addition of a further 0.1 part azodiisobutyronitrile after the first 2 hours.

The product was precipitated three times with methanol and taken up in an aliphatic hydrocarbon fraction of boiling range 70–90° C. to give a solution of 9.9% solids.

(b) Preparation of dispersion of trioxane polymer

Example 16(b) was repeated, using an initial charge of 10 parts of the block graft copolymer prepared in Example 24(a), 15 parts of aliphatic hydrocarbon of boiling range 70–90° C. and 0.3 part boron trifluoride etherate. To this was added 1.5 parts trioxane in 30 parts n-heptane. After 15 minutes at room temperature, a feed consisting of 25 parts trioxane and 25 parts n-heptane, maintained at 65° C., was added over 2½ hours, while the flask contents were heated to 40° C. and efficiently stirred.

A fine particle size dispersion of 26% solids resulted.

EXAMPLE 25

Preparation of dispersion of phenyl isocyanate polymer 10 parts of the stabilizer precursor prepared in Example 14(a) and 10 parts of an aliphatic hydrocarbon fraction of boiling range 140–160° C. were placed in a vessel and solvent removed by distillation until the temperature had reached 150° C. The vessel was fitted with reflux condenser and stirrer, 0.05 part toluylene diisocyanate and 0.005 part di-n-butyl tin dilaurate added, and the mixture refluxed for three hours.

5 parts phenyl isocyanate and 85 parts n-hexane were added and the mixture cooled to room temperature. 0.7 part of a 15% solution of n-butyl lithium in hexane was added and after a short period a fine particle size dispersion rapidly formed. After half an hour a further 20 parts of phenyl isocyanate were fed in at constant rate over two hours.

A stable, fine particle size dispersion of 23% solids resulted.

EXAMPLE 26

Preparation of dispersions of poly(carbodiimides)

10 parts of the stabilizer precursor solution as prepared in Example 14(a) and 20 parts of a mixed aromatic/aliphatic hydrocarbon fraction of boiling range 140–160° C. were placed in the reactor and 7 parts of the solvent removed by distillation so that the temperature was raised to 150° C. The flask was fitted with a reflux condenser and stirrer, and 20 parts of diisocyanatodiphenyl methane, 11 parts of xylene and 0.005 part of di-n-butyl tin dilaurate added. At this stage a minor proportion of the isocyanate groups react with the hydroxyl groups in the precursor. The resultant mixture was maintained at reflux for an hour. Then 0.03 part of 1-ethyl-3-methyl-3-phospholine-1-oxide was added, to catalyze the main polymerization of the isocyanate groups, and the total charge held at reflux. After a short time a fine particle size dispersion of a poly(carbodiimide) had formed.

The following Examples 27–43 illustrate embodiments of the invention in which the stabilizing copolymer is preformed.

EXAMPLE 27

(a) Preparation of solvatable polymeric chain for copolymer 200 parts of petroleum spirit (boiling range 100–120° C.) were refluxed under nitrogen and, over a period of 5 hours, a mixture of 97 parts of lauryl methacrylate, 3 parts of glycidyl methacrylate and 1.5 parts of benzoyl peroxide paste (60% solids content in phthalate esters) was added at a constant rate. After refluxing for a further hour the nonvolatile content of the solution was 31.2%. 1 part of lauryl dimethylamine ("Armeen" DMCD) was added and the mixture was refluxed for a further 1½ hours. The reduced viscosity of the polymer at 0.5% concentration in benzene at 25° C. and the acid value, were 0.097 and 0.82 mg. KOH/gm. respectively.

1.45 parts of methacrylic acid and 0.06 part of hydroquinone were added to the mixture which was refluxed for 6 hours until the acid value was 4.25 mg. KOH/gm.

The final product was 31.2% solution of polymer with an estimated viscosity average molecular weight of approximately 30,000 and average of about 2.2 free methacrylic acid groups per molecule calculated on this basis.

(b) Preparation of copolymer

A mixture of 900 parts of the methacrylated poly(lauryl methacrylate) solution prepared in 27(a), 57.5 parts of methyl methacrylate, 1.5 parts of methacrylic acid, 3.6 parts of azodiisobutyronitrile and 486 parts of butyl acetate was heated at 90° C. in an atmosphere of nitrogen for 2 hours. Then a further 1.8 parts of azodiisobutyronitrile were added and reaction mixture maintained at 90° C. for a further 2 hours. The polymer was precipitated in excess methanol, dried and redissolved in chloroform to give a 29.7% solids solution of the block copolymer of poly(lauryl methacrylate) and poly(methyl methacrylate/methacrylic acid). The estimated viscometric average molecular weight of the insoluble poly(methyl methacrylate/methacrylic acid) was approximately 8,000–10,000.

(c) Use of copolymer in dispersion of polyester

A mixture of 8.55 parts of bis(4-hydroxyphenyl)-2,2-propane, 3.80 parts of terephthaloyl dichloride, 3.81 parts of isophthaloyl dichloride, 16 parts of the copolymer solution of Examples 27(b), 15 parts of ethyl acetate and 90 parts of methylene chloride was heated to reflux temperature and 8.45 parts of 2,6-lutidine added. When the exothermicity of the reaction was over, a solution of 11.42 parts of terephthaloyl dichloride and 11.42 parts of isophthaloyl dichloride in 110 parts of methylene chloride was added, followed by a solution of 25.65 parts of bis-(4-hydroxyphenyl)-2,2-propane in 45 parts of ethyl acetate and 90 parts of methylene chloride. Finally, 25.35 parts of 2,6-lutidine were added when a vigorous exothermic reaction occurred. Towards the end of the addition, the base hydrochloride separated as a coarsely crystalline material. 100 parts of methylene chloride were added, and the mixture repeatedly extracted with water to remove this base hydrochloride. The resultant organic phase was dried and then diluted with petroleum spirit (boiling range 70–90° C.) to precipitate the polyester. which formed a stabilized fine particle size dispersion.

EXAMPLE 28

The procedure of Example 27 was followed except that the 16 parts of the solution of the copolymer as prepared in Example 27(b) were added to the dried solution of the polyester just prior to precipitation of the polymer with petroleum spirit (boiling range 70–90° C.). Addition of petroleum spirit (boiling range 70–90° C.) to the homogeneous solution produced a dispersion as in Example 27(c).

EXAMPLE 29

To a stirred charge of 10.15 parts of isophthaloyl dichloride, 6 parts of the copolymer solution as prepared in Example 27(b) and 168 parts n-hexane, was added as fast as possible at room temperature a solution of 12.8 parts of bis(4-hydroxy-3-methylphenyl)-2,2-propane in 168 parts of n-hexane and 21.4 parts of 2,6-lutidine. A fine particle size dispersion was formed. This was washed with 250 parts of 10% aqueous hydrochloric acid and gave a stable, fine particle size, dispersion of polyester of non-volatile content 13%.

EXAMPLE 30

To a stirred charge of 10.15 parts of isophthaloyl dichloride, 6 parts of the copolymer solution as prepared in Example 27(b), 2 parts of benzene and 50 parts of n-hexane was quickly added at room temperature 12.8 parts of bis(4-hydroxy-3-methylphenyl)-2,2-propane dissolved in a solution of 6 parts of caustic soda in 50 parts of water. A fine particle size dispersion was formed. The mixture was stirred for 15 minutes and then filtered to remove coarse granular material. The organic phase was water-washed and dried to yield a stable, fine particle size, dispersion of 20% non-volatile content.

EXAMPLE 31

To a stirred solution of 20.3 parts of isophthaloyl dichloride, 4 parts of the copolymer solution as prepared in Example 27(b), and 50 parts of benzene was added as rapidly as possible a solution of 11.6 parts of hexamethylene diamine in 50 parts of benzene and 21.4 parts of 2,6-lutidine. The mixture was stirred until cool and then extracted with water. The organic phase then consisted of a stabilized fine particle size dispersion of polyamide.

EXAMPLE 32

(a) Preparation of copolymer

A mixture of 600 parts of the methacrylated poly-(lauryl methacrylate) solution prepared in Example 27(a), 51 parts of methyl methacrylate, 9 parts of methacrylic acid, 2.4 parts of azodiisobutyronitrile, 420 parts of ethyl acetate and 240 parts of butanol was refluxed for 2 hours. Then a further 1.2 parts of azodiisobutyronitrile were added and the reaction mixture refluxed for a further 2 hours before cooling. All products of boiling point below 109° C. were removed by distillation and the entire residue precipitated three times from methanol. The resultant copolymer was dried and redissolved in chloroform. The final product consisted of a copolymer of poly(lauryl methacrylate) and poly(methyl methacrylate/methacrylic acid) of 36.1% non-volatile content and estimated viscometric average molecular weight of the insoluble poly(methyl methacrylate/methacrylic acid) grafted polymer was approximately 12,500.

(b) Use of copolymer in dispersion of polyester

A mixture of 8.55 parts of bis(4-hydroxyphenyl)-2,2-propane, 3.80 parts of terephthaloyl dichloride, 3.81 parts of isophthaloyl dichloride, 15 parts of ethyl acetate, 90 parts of methylene chloride and 11 parts of the copolymer solution as prepared in Example 32(a) was refluxed and 8.45 parts of 2,6-lutidine added. When the exothermic reaction was over, a solution of 11.42 parts of isopthaloyl dichloride and 11.42 parts of terephthaloyl dichloride in 110 parts of methylene chloride was added, followed by a solution of 25.65 parts of bis(4-hydroxyphenyl)-2,2-propane in 60 parts of methylene chloride and 45 parts of ethyl acetate. Finally, 25.35 parts of 2,6-lutidine were added. A vigorous exothermic reaction took place under reflux. The base hydrochloride separated as a coarsely crystalline product. The final mixture was washed with water and after drying, the organic phase was diluted with petroleum spirit (boiling range 70–90° C.) to give a stabilized dispersion of polyester of 18.3% non-volatile content.

EXAMPLE 33

(a) Preparation of copolymer

A mixture of 460 parts of the methacrylated poly-(lauryl methacrylate) solution prepared in Example 27(a), 24.5 parts of glycidyl methacrylate, 253 parts of ethyl acetate and 1.9 parts of azodiisobutyronitrile was refluxed for 2 hours. Then a further 0.9 part of azodiisobutyronitrile was added and the mixture refluxed for 2 hours more. The final product, which was slightly hazy, consisted of a copolymer of poly(lauryl methacrylate), and poly(glycidyl methacrylate) of 25% non-volatile content.

(b) Use of copolymer in dispersion of polyester

To a stirred charge of 10.15 parts of isophthaloyl dichloride, 8 parts of the copolymer solution as prepared in Example 33(a) and 168 parts of n-hexane was quickly added a solution of 12.8 parts of bis(4-hydroxy-3-methyl phenyl)-2,2-propane in 168 parts of n-hexane and 21.4 parts of 2,6-lutidine. A fine particle size dispersion formed immediately. 250 parts of 10% aqueous hydrochloric acid were then added with gentle agitation and the mixture allowed to separate. The organic layer consisted of a fine particle size, stable dispersion which was concentrated by reduced pressure distillation to a non-volatile content of 46%.

EXAMPLE 34

(a) Preparation of solvatable polymeric chain for copolymer 19 parts of lauryl methacrylate, 1 part of glycidyl methacrylate, 2 parts of azodiisobutyronitrile, 266 parts of ethyl acetate and 133 parts of butyl acetate were refluxed and over a period of 5 hours a mixture of 361 parts of lauryl methacrylate, 19 parts of glycidyl methacrylate and 2 parts of azodiisobutyronitrile were added. The mixture was refluxed for a further hour. 0.3 part of azodiisobutyronitrile was added and the mixture refluxed for one hour more, before cooling. The non-volatile content of the reaction product was 40%. The polymer was precipitated three times from methanol and taken up in butyl acetate. At this, the non-volatile content of the solution and reduced viscosity of the polymer at 0.5% concentration in butyl acetate at 23° C. were 45.8% and 0.12 respectively.

920 parts of the above solution, 1.38 parts of methacrylic acid, 0.43 part of lauryl dimethylamine and 0.003 part of hydroquinone were heated under reflux until the acid value had fallen to 0.995 mg. KOH/gm. This took about 2½ hours.

The final product was a 45.8% solution of a polymer with an estimated viscometric average molecular weight of approximately 84,000 and an average of about 2.86 free methacrylic acid residue per molecule calculated on this basis.

(b) Preparation of copolymer

A mixture of 109 parts of the methacrylate poly(lauryl methacrylate) solution prepared in Example 34(a), 9.6 parts of methyl methacrylate, 0.24 part of methacrylic acid, 71 parts of ethyl acetate and 0.2 part of azodiisobutyronitrile was refluxed for 2 hours. Then a further 0.2 part of azodiisobutyronitrile was added and the mixture refluxed for 2 hours before cooling. The product was a 30% solids solution of the copolymer of poly(lauryl methacrylate) and poly(methyl methacrylate/methacrylic acid). The estimated viscometric average molecular weight of the insoluble poly(methyl methacrylate/methacrylic acid) was approximately 25,000–30,000.

(c) Use of the copolymer in dispersion of polyester

To a stirred charge of 10.15 parts of isophthaloyl dichloride, 10 parts of the copolymer as prepared in Example 34(b), 2 parts of benzene and 50 parts of n-hexane was quickly added at room temperature 12.8 parts of bis(4-hydroxy-3-methylphenyl)-2,2-propane dissolved in a solution of 6 parts of caustic soda in 50 parts of water. A fine particle size dispersion formed. After stirring for 15 minutes, the mixture was filtered to remove coarse granular products. The organic phase was further extracted with water and dried to give a stable fine particle size dispersion of polyester of 21.2% non-volatile content.

EXAMPLE 35

Example 34(b) was repeated using half the quantities of azodiisobutyronitrile. The product was a 32.2% solution of a copolymer of polylauryl methacrylate with a methyl methacrylate/methacrylic acid copolymer.

To a mixture of 5 parts of this copolymer solution, 10 parts of cyclohexane and 0.75 part boron trifluoride etherate was added 100 parts of a 5% solution of trioxane in cyclohexane. A fine particle size dispersion immediately formed.

The dispersion was stirred and heated to 45° C. while a mixture of 11.7 parts trioxane and 1.3 parts 1,3-dioxolane maintained just above its melting point was added at constant rate over 45 minutes. Solvent was allowed to distill off slowly at this temperature for a further 90 minutes, yielding 40 parts of a stable fine particle size dispersion of 27.5% total solids.

EXAMPLE 36

To a mixture of 13.9 parts of the solution of copolymer prepared in Example 32(a), 36.1 parts of cyclohexane and 0.9 part boron trifluoride etherate, was added 300 parts of 5% trioxane in cyclohexane. A fine particle size dispersion immediately formed.

The mixture was heated to 55° C. and 60 parts of a mixture of 54 parts trioxane and 6 parts 1,3-dioxolane maintained just above its melting point was added at constant rate over a period of 4¼ hours. After a further 2 hours, the dispersion was cooled to room temperature.

The product was a stable fine particle size dispersion of 15% solids.

EXAMPLE 37

10 parts of glycidyl acetate were mixed with 20 parts anisole, 80 parts n-hexane and 10 parts of a 24% solution of a block copolymer of lauryl methacrylate and polyvinyl pyrrolidone. A solution of 0.3 part boron trifluoride etherate in 5 parts anisole and 5 parts n-hexane was added and the mixture shaken. A fine particle size stable dispersion formed at once, and after standing for 5 hours at room temperature, the total solids were found to be 9.1%.

EXAMPLE 38

Example 37 was repeated using phenyl glycidyl ether in place of glycidyl acetate. A fine particle size dispersion formed at once, and after standing for 3 hours at room temperature, the total solids were found to be 9.5%.

EXAMPLE 39

15 parts of a 25% solution in ethyl acetate of a block copolymer of lauryl methacrylate and glycidyl methacrylate, 5 parts phenyl glycidyl ether and 45 parts n-hexane were refluxed in an atmosphere of nitrogen. Approximately 1 part of aluminium triisobutyl was added and a dispersion began to form fairly rapidly.

After 3 hours' refluxing a stable fine particle size dispersion of 13.5% solids was obtained.

EXAMPLE 40

12 parts of the copolymer solution used in Examples 38, 5 parts phenyl glycidyl ether, 45 parts n-hexane and approximately 1 part aluminium triisobutyl were heated to reflux in an atmosphere of nitrogen. A fine particle size dispersion began to form and refluxing continued for 6 minutes.

15 parts phenyl glycidyl ether were added at constant rate to the refluxing liquid over a total of 1½ hours.

The product was a slightly viscous stable dispersion of 48.5% solids.

EXAMPLE 41

Pure formaldehyde prepared by heating 250 parts methyl cyclohexyl hemiformal at 150° C. in a gentle stream of nitrogen, was purified by passing through traps at −15° C. and passed into a stirred mixture of 16 parts of the copolymer solution prepared in Example 33(a), 80 parts n-hexane and 1 part lauryl dimethylamine, maintained at −76° C. Formaldehyde was fed in for 4 hours.

A stable dispersion of fine particle size formed, of 10% solids.

EXAMPLE 42

Example 41 was repeated replacing the copolymer solution by that used in Example 39 and replacing lauryl dimethylamine by stannous oleate.

The product was a fairly stable, rather viscous, dispersion of 12.5% solids.

Using this catalyst and stabilizer, similar results were obtained using impure formaldehyde prepared by heating 40 parts paraform in 100 parts dibutyl phthalate to 200° C. and dispensing with the purification traps.

EXAMPLE 43

Example 41 was repeated replacing the copolymer solution by 5.4 parts of the block copolymer solution used in Example 38, and lauryl dimethylamine by 1 part of a 15% solution of n-butyl lithium in hexane. Over the space of 3 hours a very stable, fine particle size, dispersion of low solids formed (approximately 5%).

What we claim is:

1. A process of producing a dispersion in organic liquid of a polymer wherein the links between monomer or comers forming the polymer chain involve an atom other than carbon selected from the group consisting of oxygen and nitrogen, in which process:
   (i) the polymer is produced by polymerizing monomer or comers dissolved in the organic liquid to produce the polymer which is insoluble in the organic liquid and forms dispersed particles therein;
   (ii) the polymerization is carried out in the presence in solution in the organic liquid of a block or graft copolymer having one polymeric constituent which is solvated by the organic liquid and another polymeric constituent of a different degree of polarity which is non-solvated by the organic liquid and becomes associated with the precipitated polymer particles, the amount of block or graft copolymer being from 1% to 25% by weight of the disperse polymer, and
   (iii) the rate of propagation of the polymerization reaction at the stage when dispersed particles of polymer are first formed is such that further units are being added to growing polymer chains at intervals on average not greater than 5 seconds.

2. A process as claimed in claim 1 in which the rate of propagation of the polymerization reaction at the stage when dispersed particles of polymer are first formed is such that further units are being added to growing polymer chains at intervals on average not greater than 0.5 second.

3. A process as set forth in claim 1 for producing a dispersion in organic liquid of a condensation polymer by polymerization of two comers in the organic liquid, in which one of the comers and the stabilizing block or graft copolymer are dissolved in the organic liquid and the second comer is initially dissolved in another liquid which is immiscible with the organic liquid, the polymerization being carried out by mixing the two liquids whereupon the second comer diffuses into and reacts in the organic liquid to form insoluble polymer particles which are stabilized by the block or graft copolymer, the two liquids then being separated.

4. A process as claimed in claim 3 in which the organic liquid is non-polar and the other immiscible liquid is water.

5. A process as claimed in claim 1 in which the block or graft copolymer is used in a proportion of from 2.5% to 10% by weight of the disperse polymer.

6. A process as claimed in claim 1 in which the molecular weight of the solvated constituent of the block or graft copolymer is from 5,000 to $10^6$.

7. A process as claimed in claim 1 in which the molecular weight of the solvated constituent of the block or graft copolymer is from 10,000 to 100,000.

8. A process as claimed in claim 6 in which the molecular weight of the non-solvated constituent of the block or graft copolymer is lower than that of the solvated constituent.

9. A process as claimed in claim 1 in which the organic liquid is essentially aliphatic or aromatic hydrocarbon.

10. A process as claimed in claim 1 in which the block or graft copolymer is also produced in the organic liquid by having present therein during the polymerization, a precursor comprising a polymeric chain solvated by the organic liquid and a group or groups which will copolymerize with the monomer or comer, up to 50% of the monomer or comer being copolymerized with the group or groups of the precursor to attach non-solvated polymeric chain or chains thereto, the solvated polymeric chain being linked to non-solvated polymeric chain or chains at on average not more than two points along the solvated polymeric chain.

11. A process as claimed in claim 10 in which the monomer or comer and the copolymerizable groups of the precursor have a reactivity ratio of between 0.1 and 10, preferably about unity.

12. A process as claimed in claim 10 in which the precursor is a block or graft copolymer, one polymeric constituent of which provides the solvated chain and another polymeric constituent of which contains the copolymerizable groups.

13. A process as claimed in claim 10 in which the copolymerizable group is an initiator of the polymerization reaction.

14. A process as claimed in claim 10 in which the proportion of precursor used is from 1% to 25% by weight of the units to be polymerized.

15. A process as claimed in claim 10 in which not more than 20% by weight of the monomer or comer is copolymerized with the precursor.

16. A stable dispersion of polymer in organic liquid made by a process as claimed in claim 1.

References Cited

UNITED STATES PATENTS

| | | | |
|---|---|---|---|
| 3,095,388 | 6/1963 | Osmond et al. | 260—33.6 |
| 3,136,738 | 6/1964 | Hedrick et al. | 260—857 |
| 3,166,524 | 1/1965 | Schmidle et al. | 260—879 |
| 3,255,125 | 6/1966 | Block et al. | 260—2 |
| 3,288,726 | 11/1966 | Wagner | 260—2 |

MORRIS LIEBMAN, *Primary Examiner.*

L. T. JACOBS, *Assistant Examiner.*